Sept. 22, 1959     E. A. LINDGREN     2,905,219
TRACTION DEVICE
Filed Sept. 13, 1957     2 Sheets-Sheet 1
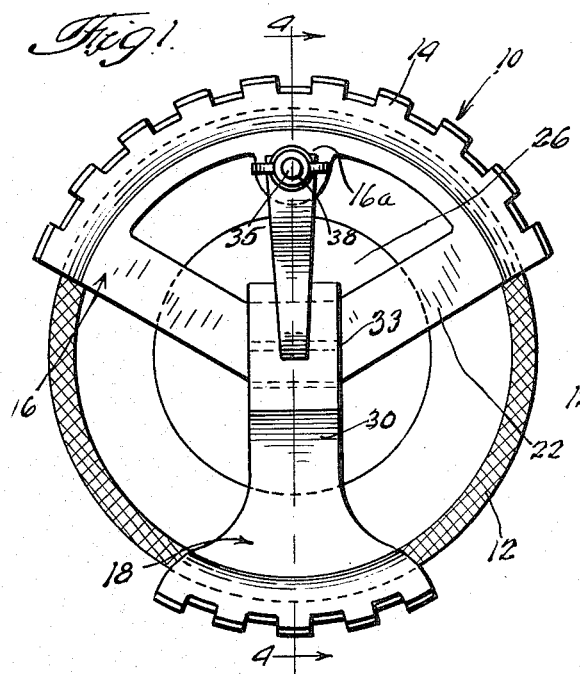
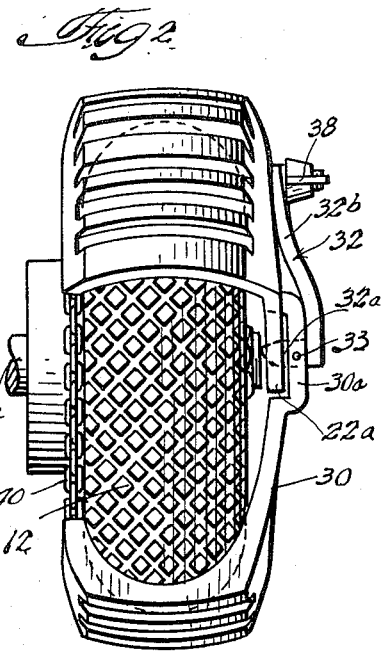
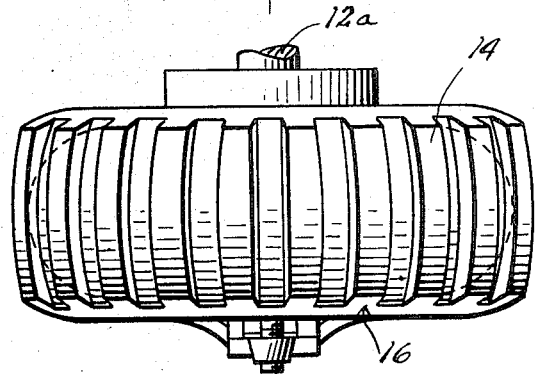
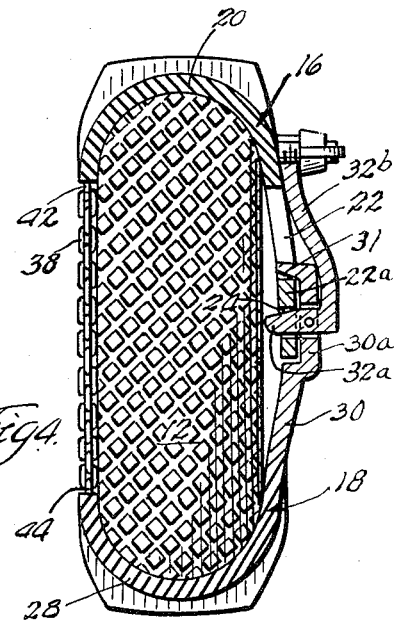
Inventor
Erik A. Lindgren

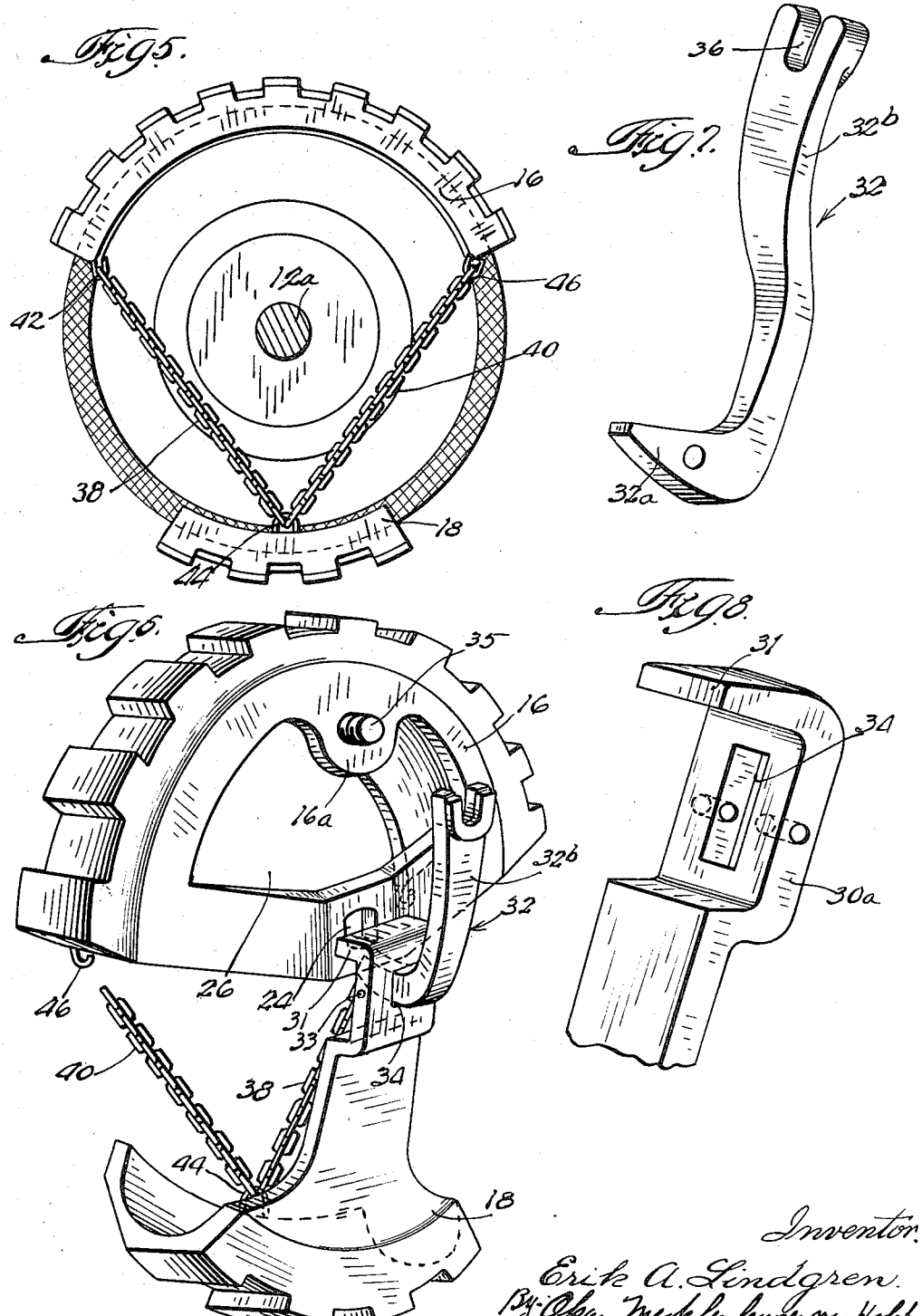

United States Patent Office 2,905,219
Patented Sept. 22, 1959

2,905,219

TRACTION DEVICE

Erik A. Lindgren, Chicago, Ill.

Application September 13, 1957, Serial No. 683,727

5 Claims. (Cl. 152—228)

This invention relates to a traction device and more particularly to a device which may be attached to a vehicle tire in order to increase the traction thereof.

In vehicle traction devices of present day construction, chains or the like are attached to the tire generally in a very loose manner. Such devices have had no satisfactory means of tightening them to the tire or wheel of the vehicle. In most instances a buckle or clamp is provided for this purpose, the tension for holding the device in place having been manually applied prior to engagement of the clamp or buckle. Such an arrangement for attaching chains or the like has been reasonably satisfactory because a certain degree of looseness has not been considered to be greatly deleterious to the traction qualities of these devices, although considerable wear on the tire quite often results from the loose fit thereof. However, a problem arises in traction devices employing traction surfaces of considerably larger area where the road gripping surface is cleated and extends a considerable distance over the circumference of the tire for superior traction. Such devices must be very tightly attached to the tire such that there is a minumum amount of relative movement between the traction device and the tire. It has been applicant's experience that such traction devices require a special tightening means for tightening the device on the vehicle wheel or tire. It is preferred that any such tightening means be attached to and carried by the traction device to prevent the tightening means from becoming lost or misplaced. Such a tightening means should be very simple to manipulate, and should enable the device to be mounted and tightened quickly for in many instances the device will be mounted on the tire under adverse conditions such as when the tire is partly covered with snow or mud or in very cold weather when manual manipulation becomes awkward and difficult.

The tightening means, if carried by the traction device, should also be very compact such that no portion of the device projects outwardly from the tire to interfere with the fender or other surrounding portions of the vehicle.

It is therefore one particular object of this invention to provide a traction device having a very large traction surface with superior traction qualities.

It is another object of this invention to provide a traction device which may be tightened in place on a vehicle tire without the aid of extraneous tools or equipment.

It is still a further object of this invention to provide a vehicle traction device which is very easily mounted on the vehicle tire even under adverse conditions.

It is another object of this invention to provide a vehicle traction device having a large traction surface and employing a means for tightening the device to the tire such that little or no relative movement between the device and the tire is permitted.

It is still a further object of this invention to provide a vehicle traction device which is of simple construction and which has superior traction qualities.

Other objects may be seen and a fuller understanding of the invention may be had by referring to the following description and claims taken in conjunction with the accompanying drawings.

In accordance with one embodiment of this invention a traction device is provided for use in combination with a vehicle tire. This traction device comprises a first traction member extending across the tread of the tire and having a portion extending radially inward on one side of the tire. A latching formation, preferably in the form of an aperture, is carried by this portion of the first traction member. A second traction member extends across the tread of the tire preferably at a point diametrically opposite the first traction member, and this second traction member has a portion extending radially inward toward the first traction member on the one side of the tire. The end of this second member inwardly extending portion preferably overlies the inwardly extending portion of said first traction member. A latching member preferably in the form of an L-shaped lever member is mounted on said second traction member and is adapted to engage the latching formation carried on said first traction member.

The lever member is adapted to move in a direction to effect tightening movement of the traction members radially inward toward each other. Means is provided for locking the latching lever member in its engaged position, and means is provided on the opposite side of the tire for maintaining the traction member in the proper position on the tire. The locking means is preferably in the form of a bolt and wing nut, and the means for maintaining the traction member in proper position on the tire is preferably a plurality of chains connecting the first and second traction members together.

With reference to the drawings:

Figure 1 is a side elevational view showing a vehicle tire with the traction device mounted thereon;

Fig. 2 is an end view of the vehicle tire with the traction device mounted thereon;

Fig. 3 is a plan view of the tire-mounted traction device;

Fig. 4 is a sectional elevational view taken along line 4—4 of Fig. 1;

Fig. 5 is a side elevational view of the tire-mounted traction device showing the reverse side thereof;

Fig. 6 is a perspective view of the traction device removed from the tire;

Fig. 7 is a perspective view of the latching lever member which is carried by one of the traction members and effects tightening of the traction device on the vehicle tire; and Fig. 8 is a sectional elevational view showing the portion of the traction member on which the lever member is pivotally mounted.

With more particular reference to the drawings, a traction device 10 is adapted to be mounted on a vehicle tire 12 in order to improve the traction qualities of the tire. For this purpose the traction device 10 which is preferably constructed of steel has a cleated rubber-like traction surface 14 laminated thereto which is adapted to engage the surface of the road and to provide the required traction for the wheel upon which the device is mounted.

Traction device 10 includes two traction members 16 and 18, respectively. As best seen in Figures 1 and 4, traction member 16 extends a substantial distance about the circumference (i.e. at least a quarter of the circumference) of the tire and has a portion 20 which is concave inwardly and extends across the tread of the tire 12. A support member 22 integral with the concave portion 20 of traction member 16 connects the two ends of this traction member and extends radially inward toward the second traction member 18. The midportion 22a of this supporting member is disposed approximately in line with the axis of the tire or wheel axle 12a and has an aperture 24 therein, as best seen in Figure 6. The midportion 22a of the supporting member is also spaced away from the midportion 16a of the traction member 16, forming an aperture 26 therebetween.

Traction member 18 is preferably disposed on the tire diametrically opposite traction member 16, and has a portion 28 which is concave inwardly and extends across the tread of the tire 12. A second portion 30 integral with portion 28 extends radially inward toward the first traction member 16 and, except for section 30a adjacent the end thereof, preferably lies in the same plane as supporting member 22, see Figure 2.

Section 30a, shown in detail in Figure 8, is recessed such that when the traction members 16 and 18 are tightened in position on the tire 12, this section overlies and receives support member midportion 22a, as shown in Figures 2 and 4.

A flange-like projection 31, integral with portion 30 and disposed adjacent recessed end 30a thereof, extends inwardly in a direction substantially parallel to the axis of the tire. Projection 31 is adapted to extend over the midportion 22a of the first traction member support and into the aperture 26 intermediate midportion 22a and midportion 16a of traction member 16 when the traction members are tightened in position on the tire. This engagement of projection 31 over support member midportion 22a provides an additional locking feature for the traction device.

A tightening and latching member is provided in the form of a substantially L-shaped lever 32 shown in detail in Figure 7. This lever has an arm 32a and an arm 32b, and is pivotally mounted by means of transverse pin 33 in slot 34 formed in recessed end section 30a. Arm 32a of lever member 32 extends inwardly parallel to the axis of the tire and is adapted to be inserted within aperture 24 of supporting member midportion 22a. The movement of lever arm 32b which is integral with arm 32a effects tightening movement of the traction device. When arm 32a is engaged in aperture 24, movement of the free end of arm 32b toward the traction member 16 causes arm 32a to bear in aperture 24, and traction members 16 and 18 are drawn radially inward toward each other.

A means is provided for locking the latching lever 32 in the tightened position. For this purpose, an externally threaded bolt 35 is provided. Bolt 35 is attached to and projects outwardly from midportion 16a of traction member 16, as seen in Figure 6.

An aperture or slot 36 is formed in lever arm 32b adjacent the free end thereof and is adapted to receive bolt 35 when this end of arm 32b is moved toward traction member 16 to effect tightening of the traction device on the tire, as previously described.

An internally threaded wing nut 38 is adapted to be placed on bolt 35 after the end of lever arm 32b has been moved to the tightened position and the slot 36 in arm 32b has received the bolt. Wing nut 38 is threadably tightened on bolt 35 and is adapted to bear against the surface of lever member 32b adjacent slot 36, thereby locking this lever arm in the tightened position, as shown in Figs. 2 and 4.

In order to maintain the traction members 16 and 18 in proper position on the tire during and after the tightening thereof, two chain members 38 and 40 are provided on the reverse side of the tire, see Fig. 5. One end of chain 38 is attached to a lug 42 disposed adjacent one end of traction member 16, and the other end of chain 38 is connected to a lug 44 mounted centrally on traction member 18. One end of chain 40 is also connected to lug 44, and the other end thereof is connected to a hook-like lug 46 disposed adjacent the other end of traction member 16.

Lug 46 is constructed such that chain 40 may easily be engaged therewith or disengaged therefrom when the traction members are loose on the tire. This permits the device to be placed on the tire without interference with the axle 12a of the vehicle. When in place, the chain members 38 and 40 straddle the axle of the vehicle, as shown in Fig. 5, and provide a very uniform and rigid holding connection between the traction members on the reverse side of the tire.

To mount the traction device on the vehicle tire, chain 40 is disengaged from lug 46, and traction members 16 and 18 are placed on the tire 12 diametrically opposite each other with their concave portions 20 and 28 respectively extending across the tread of the tire. Chain 40 is then engaged in lug 46.

To effect tightening of the device and locking of the two traction members in place on the tire, lever arm 32a of lever 32 is inserted in aperture 24, and lever arm 32b, integral with arm 32a, is moved toward traction member 16. This movement of lever arm 32b causes traction members 16 and 18 to be drawn radially inward toward each other, whereupon flange-like projection 31 is engaged over the midportion 22a of the first traction member support. At this point, arm 32b has moved sufficiently inward toward traction member 16 that bolt 35 projects through slot 36. Wing nut 38 is then threadably tightened on bolt 35 behind lever arm 32a, and this arm is thus locked in the tightened position.

It may be seen that a very novel traction device has been provided having a very large traction surface and capable of being tightened on the tire such that little or no relative movement between the traction device and the tire is permitted. The traction device is very easily mounted on the tire even under the most adverse conditions. The tightening mechanism, carried as a part of the traction device, is adapted to be locked in the tightened position, and complicated latching and tightening mechanisms are eliminated, as is the need for extraneous tools and equipment.

Although the invention has been described with a certain degree of particularity, it is understood that the present disclosure has been made only by way of example and that numerous changes in the details of construction and the combination and arrangement of parts may be resorted to without departing from the spirit and scope of the invention as hereinafter claimed.

What is claimed is:

1. For use in combination with a vehicle tire, a traction device comprising a first member adapted to extend across the tread of the tire and having a portion adapted to extend radially inward on one side of the tire, a latching formation carried by said first traction member on said inwardly extending portion, a second traction member adapted to extend across the tread of the tire substantially opposite said first traction member, said second member having a portion adapted to extend radially inward on the one side of the tire and to overlie the inwardly extending portion of said first traction member, a lever member pivotally mounted on said second traction member and having a first lever arm adapted to engage the latching formation of said first traction member, a second lever arm integral with said first arm and adapted to move said first arm in a direction to effect tightening movement of said members radially inward toward each other when said first lever arm is thus engaged, an externally threaded locking bolt mounted on said first traction member and extending transversely outwardly, said second lever arm having an aperture formed therein for receiving said locking bolt when said second lever arm is moved to effect tightening of said traction members, an internally threaded locking nut adapted to be threadably tightened on said locking bolt after said bolt has been received within the aperture of said second lever arm, whereby said lever member may be locked in the tightened position, and a plurality of connecting elements adapted to extend between said traction members on the other side of the tire to maintain said traction members in proper position when they are tightened on the tire.

2. The construction of claim 1 wherein said traction members are constructed of metal with a cleated rubber-like traction surface attached thereto.

3. For use in combination with a vehicle tire, a traction device comprising a first member adapted to extend across the tread of the tire and having a portion adapted to extend radially inward on one side of the tire, said first member portion having an aperture formed therein, a second traction member adapted to extend across the tread of the tire substantially opposite said first traction member, said second member having a portion adapted to extend radially inward on the one side of the tire and to overlie the inwardly extending portion of said first traction member, a substantially L-shaped lever member pivotally mounted on said second traction member and having a first lever arm adapted to engage the aperture formed on said first traction member, a second lever arm integral with said first arm and adapted to move said first arm in a direction to effect tightening movement of said members radially inward toward each other when said first lever arm is thus engaged in said aperture, an externally threaded locking bolt mounted on said first traction member and extending transversely outward, said second lever arm having an aperture formed therein for receiving said locking bolt when said second lever arm is moved to effect tightening of said traction members, an internally threaded locking nut adapted to be threadably tightened on said locking bolt after said bolt has been received within the aperture of said second lever arm, whereby said lever member may be locked in the tightened position, and a plurality of connecting elements adapted to extend between said traction members on the other side of the tire to maintain said traction members in proper position when they are tightened on the tire.

4. The structure of claim 3 wherein a second aperture is formed in the inwardly extending portion of said first traction member, a rigid projecting element mounted on said second traction member and adapted to engage said second aperture when said traction members have been tightened in position by means of said lever member.

5. For use in combination with a vehicle tire, a traction device comprising a first member adapted to extend across the tread of the tire and a substantial distance along the circumference of the tire, a supporting member connected to said first traction member and adapted to extend between points adjacent the ends thereof on one side of the tire, said supporting member having its midportion disposed approximately in line with the axis of the tire and having an aperture formed therein, a second traction member adapted to extend across the tread of the tire substantially opposite said first traction member, said second member having a portion adapted to extend radially inward on the one side of the tire and to overlie said first traction supporting member, a substantially L-shaped lever member pivotally mounted on said second traction member and having a first lever arm adapted to engage the aperture formed in said supporting member, a second lever arm integral with said first arm and adapted to move said first arm in a direction to effect tightening movement of said traction members radially inward toward each other when the first lever arm is thus engaged in said aperture, a rigid flange-like projecting element mounted on said second traction member and adapted to engage over said supporting member when said traction members have been tightened in position by means of said lever member, an externally threaded locking bolt mounted on said first traction member and extending transversely outward, said second lever arm having an aperture formed therein for receiving said locking bolt when said second lever arm is moved to effect tightening of said traction members, an internally threaded locking nut adapted to be threadably tightened on said locking bolt after said bolt has been received within the aperture of said second lever arm, whereby said lever member may be locked in the tightened position, and a plurality of connecting elements adapted to extend between said traction members on the other side of the tire to maintain said traction members in proper position when they are tightened on the tire.

References Cited in the file of this patent

UNITED STATES PATENTS

| | | |
|---|---|---|
| 2,315,838 | Bryon | Apr. 6, 1943 |
| 2,453,611 | Zimmer | Nov. 9, 1948 |
| 2,456,544 | Varner | Dec. 14, 1948 |
| 2,640,522 | Schroen | June 2, 1953 |
| 2,820,501 | Heuneman | Jan. 21, 1958 |